United States Patent Office 3,493,360
Patented Feb. 3, 1970

3,493,360
HERBICIDES
Llewellyn W. Fancher, Lafayette, and Duane R. Arneklev, Sunnyvale, Calif., assignors to Stauffer Chemical Company, New York, N.Y., a corporation of Delaware
No Drawing. Original application Mar. 26, 1965, Ser. No. 443,100. Divided and this application May 14, 1968, Ser. No. 736,910
Int. Cl. A01n 9/12, 9/20
U.S. Cl. 71—100  6 Claims

ABSTRACT OF THE DISCLOSURE

This invention pertains to the method of combating weeds with certain herbicidally active N-substituted carbamylmethyl chloroacetamides and thiocarbamylmethyl chloroacetamides corresponding to the formula

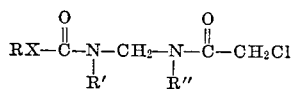

in which X is oxygen or sulfur; R is alkyl, having from 1 to 10 carbon atoms, lower alkenyl, lower alkynyl, lower haloalkyl, phenyl, nuclearly substituted phenyl in which the substituents are 1 to 5 halogens, especially chlorine or naphthyl; R' is hydrogen, lower alkyl, phenyl, lower alkenyl or cycloalkyl; and R" is hydrogen, lower alkyl or lower alkenyl; provided that when R is alkyl, phenyl or naphthyl, then R' is lower alkenyl. Representative compounds are: N-[propargyloxy-N'-methylcarbamylmethyl] chloroacetamide, N-[allyloxy-N'-methylcarbamylmethyl] chloroacetamide, N-[β-chloroethoxy-N'-methylcarbamylmethyl]chloroacetamide, N-[β - chloroethoxycarbamylmethyl]chloroacetamide, N - [2,4 - dichlorophenoxy - N'-methylcarbamylmethyl]chloroacetamide, N-[p-chlorophenoxy - N' - methcarbamylmethyl]chloroacetamide, N-[ethoxy-N'-allylcarbamylmethyl]chloroacetamide.

---

This application is a division of copending application Ser. No. 443,100, filed Mar. 26, 1965 now abandoned.

This invention relates to certain new and novel organic compounds which may be used as effective herbicides. More specifically, this invention relates to certain N-substituted carbamyl methyl-chloroacetamides and thiocarbamylmethyl-chloroacetamides and to the use of such compounds in herbicidal composition.

The compounds comprising the instant class correspond to the general formula

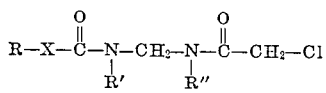

wherein X is selected from the group consisting of oxygen and sulfur, R is selected from the group consisting of alkyl having from 1 to 10 carbon atoms, inclusive, lower alkenyl, lower alkynyl, lower haloalkyl, phenyl, nuclearly substituted phenyl wherein said substituents are from 1 to 5 halogens, inclusive, especially chlorine and naphthyl, R' is selected from the group consisting of hydrogen, lower alkyl, phenyl, lower alkenyl and cycloalkyl, and R" is selected from the group consisting of hydrogen, lower alkyl and lower alkenyl:

The compounds herein contemplated can be prepared by several methods. One such general method applied in preparing the compounds was the condensation reaction between the appropriate substituted carbamate or thiocarbamate and the appropriate N-hydroxymethyl chloroacetamide. A stable acid condensation catalyst, such as 2-naphthalene-sulfonic acid monohydrate, was added to facilitate the completion of the reaction. The reaction proceeds readily in the liquid phase. The employment of an inert organic solvent is also useful, facilitating processing as well as agitation of the reactants. Temperatures that permit operation in the liquid phase and which are between room temperature and reflux temperature of the solvent, if any is used, are employed. Preferably the reaction mixture is refluxed, usually at an elevated temperature.

It has been found that the compounds of the present invention are particularly effective as herbicides. They are effective in the control of grasses and broadleaf plants with both pre-emergence and post-emergence activity.

The compounds of the present invention may be made in accordance with the following examples.

EXAMPLE 1

Preparation of N-[ethoxy-N'-methylcarbamylmethyl] chloroacetamide

A reaction mixture consisting of 41.2 g. (0.4 M) of ethyl-N-methylcarbamate, 49.4 g. (0.04 M) of N-hydroxymethyl chloroacetamide, 1.0 g. of 2-naphthalene-sulfonic acid monohydrate in 150 cc. of benzene was stirred and refluxed for one hour. The apparatus for the reaction was equipped with a continuous water extractor. After one hour and forty-five minutes of refluxing, 8.0 cc. of water was collected in the extractor. After cooling to room temperature, a small amount of solid was precipitated which was filtered off and discarded. The filtrate was evaporated to remove the organic solvent, after washing with water and drying over anhydrous magnesium sulfate. There was obtained 78.4 g. (94 percent of theory) of the title compound with an $n_D^{30}=1.4800$.

*Analysis.*—Calculated: Cl, 17.0%; N, 13.4%. Found: Cl, 16.4%; N, 13.2%.

EXAMPLE 2

Preparation of N-[ethylthio-N'-methylcarbamylmethyl] chloroacetamide

By a similar procedure as used in Example 1, 47.6 g. (0.4 M) of ethyl-N-methylthiocarbamate, 49.4 g. (0.4 M) of N-hydroxymethyl chloroacetamide, 1.0 g. of 2-naphthalene-sulfonic acid monohydrate in 150 cc. of benzene were stirred and refluxed for 12 hours. At the end of this time 7.2 cc. of water had been collected in the continuous water extractor. After cooling, the product was washed with dilute aqueous sodium chloride solution, dried over anhydrous magnesium sulfate, filtered and the organic solvent evaporated. There was obtained 58.2 g. (65 percent of theory) of the title compound, $n_D^{30}=1.5286$.

*Analysis.*—Calculated: Cl, 15.8%; N, 12.5%; S, 14.3%. Found: Cl, 15.3%; N, 11.4%; S, 15.0%.

EXAMPLE 3

N-[ethoxycarbamylmethyl-N'-methyl]chloroacetamide

By the same procedure as was used in the previous examples, 26.7 g. (0.3 M) of ethyl-N-methylcarbamate, 41.3 g. (0.3 M) of N-hydroxymethyl-N-methyl chloroacetamide, 1.0 g. of 2-naphthalene-sulfonic acid monohydrate in 150 cc. of benzene were allowed to react. There was obtained 60.5 g. (96.5 percent of theory) of the title compound, $n_D^{30}=1.4826$.

*Analysis.*—Calculated: Cl, 17.0%; N, 13.4%. Found: Cl, 16.1%; N, 13.5%.

EXAMPLE 4

Preparation of N-[phenoxycarbamylmethyl] chloroacetamide

By the same procedure as was used in the previous examples, 27.4 g. (0.2 M) of phenylcarbamate, 24.7 g. (0.2 M) of N-hydroxymethyl chloroacetamide, 1.0 g.

of 2-naphthalene-sulfonic acid monohydrate in 180 cc. of benzene were allowed to react. There was obtained 35.1 g. (72.5 percent of theory) of the title compound M.P. 154–156° C.

*Analysis.*—Calculated: Cl, 14.7%; N, 11.5%. Found: Cl, 15.0%; N, 12.0%.

The following is a table of the compounds prepared according to the aforedescribed procedures. Compound numbers have been assigned to each compound and are then used for identification throughout the balance of the application.

invention were tested as herbicides in the following manner.

Pre-emergence herbicide test

The seeds of crab grass, annual bluegrass, watergrass, wild oats, pigweed, mustard and curly dock were planted in individual rows one-half inch deep in Santa Cruz sandy loam soil contained in compressed paper flats 8¼″ x 6½″ which are 2¾″ deep. Enough seeds were planted to give about thirty to fifty plants of each of the

TABLE I

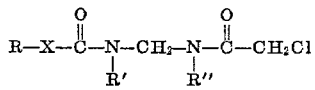

| Compound No. | R | X | R' | R'' | M.P. or $n_D^{30}$ |
|---|---|---|---|---|---|
| 1 | Ethyl | O | H | H | 142–144° C. |
| 2 | Phenyl | O | methyl | H | 1.5448. |
| 3 | α-Naphthyl | O | do | H | Semi-solid. |
| 4* | Ethyl | O | do | H | 1.4800. |
| 5 | do | O | Ethyl | H | 1.4760. |
| 6 | i-Propyl | O | Methyl | H | 1.4722. |
| 7 | Ethyl | O | Phenyl | H | 1.5362. |
| 8 | 2-propynyl | O | Methyl | H | 1.5011. |
| 9 | do | O | do | H | 1.4922. |
| 10 | Cl-ethyl | O | do | H | 1.4980. |
| 11 | do | O | H | H | 139–143° C. |
| 12 | Methyl | O | Methyl | H | 1.4860. |
| 13 | do | O | H | H | 127–131° C. |
| 14* | Ethyl | S | Methyl | H | 1.5286. |
| 15 | 2,4-Cl₂-phenyl | O | do | H | 108–110° C. |
| 16 | 4-Cl-phenyl | O | do | H | 111–116° C. |
| 17* | Ethyl | O | H | Methyl | 1.4826. |
| 18 | do | O | Methyl | do | 1.4710. |
| 19 | do | O | do | 2-propenyl | 1.4727. |
| 20 | do | O | H | do | 1.4820. |
| 21* | Phenyl | O | H | H | 154–156° C. |
| 22 | do | O | Phenyl | H | 1.5680. |
| 23 | Ethyl | O | 2-propenyl | H | 1.4874. |
| 24 | do | O | n-Butyl | H | 1.4725. |
| 25 | do | O | Cyclohexyl | H | 1.4940. |
| 26 | 1-methyl-1-heptyl | O | Methyl | H | 1.4758. |
| 27 | 2-ethyl-1-hexyl | O | do | H | 1.4730. |

* No. 4 prepared in Example 1. No. 14 prepared in Example 2. No. 17 prepared in Example 3. No. 21 prepared in Example 4.

The following substituted-thiocarbamylmethyl-chloroacetamides were also prepared according to the aforedescribed procedures: methylthio-N-ethylcarbamylmethyl-chloroacetamide, phenylthio-N-ethylcarbamylmethyl-chloroacetamide, methylthio-N-(2 - propenyl) carbamylmethyl-chloroacetamide, and ethylthio-N-n-butylcarbamylmethyl-chloroacetamide.

As previously mentioned, the herein described novel compositions produced in the above described manner are phytotoxic compounds which are useful and valuable in controlling various plant species. The compounds of this weed species in each flat. The flats were watered after planting. The following day each flat was sprayed at the rate of 20 pounds of the candidate compound under test in 80 gallons of solution per acre. An atomizer was used to spray the solution on the soil surface. The flats were placed in a greenhouse at 80° F. and watered regularly. Two weeks later the degree of weed control was determined by comparing the amount of germination and growth of each weed in the treated flats with weeds in several untreated control flats. The results of this test are reported in Table II.

TABLE II.—PRE-EMERGENCE ACTIVITY RATE 20 LBS./A

| Compound No. | Crab grass | Annual bluegrass | Water grass | Wild oat | Pigweed | Mustard | Curled dock |
|---|---|---|---|---|---|---|---|
| 1 | +++ | +++ | +++ | +++ | +++ | +++ | +++ |
| 2 | +++ | +++ | +++ | +++ | + | – | – |
| 3 | +++ | +++ | +++ | – | +++ | – | – |
| 4 | +++ | +++ | +++ | +++ | +++ | +++ | +++ |
| 5 | +++ | +++ | +++ | +++ | ++ | ++ | + |
| 6 | +++ | +++ | +++ | +++ | +++ | ++ | ++ |
| 7 | ++ | +++ | +++ | +++ | ++ | + | + |
| 8 | +++ | +++ | +++ | +++ | +++ | + | ++ |
| 9 | +++ | +++ | +++ | +++ | +++ | – | ++ |
| 10 | +++ | +++ | +++ | +++ | +++ | – | ++ |
| 11 | +++ | +++ | +++ | +++ | +++ | – | ++ |
| 12 | +++ | +++ | +++ | ++ | +++ | ++ | ++ |
| 13 | +++ | +++ | +++ | +++ | +++ | – | ++ |
| 14 | +++ | +++ | +++ | +++ | +++ | ++ | +++ |
| 15 | +++ | +++ | +++ | ++ | +++ | + | + |
| 16 | +++ | +++ | +++ | +++ | +++ | +++ | ++ |
| 17 | +++ | +++ | +++ | ++ | +++ | ++ | ++ |
| 18 | ++ | +++ | +++ | + | +++ | ++ | ++ |
| 19 | +++ | +++ | +++ | +++ | +++ | +++ | ++ |
| 20 | +++ | +++ | +++ | +++ | +++ | +++ | ++ |
| 21 | +++ | +++ | +++ | +++ | +++ | +++ | ++ |
| 22 | +++ | +++ | +++ | – | ++ | – | – |
| 23 | +++ | (++) | +++ | [+] | – | – | – |
| 24 | ++ | (+++) | +++ | [–] | – | – | – |
| 25 | +++ | (+++) | +++ | [+] | – | + | – |
| 26 | + | (–) | + | [+] | – | – | – |
| 27 | +++ | (+++) | +++ | [–] | – | – | – |

+=Slight injury. ++=Moderate injury. +++=Severe injury or death. ( )=Foxtail. [ ]=Red oats.

Post-emergence herbicide test

The seeds of five weed species, crab grass, watergrass, wild oats, mustard, curled dock, and one crop, pinto beans (*Phaseolus vulgaris*) were planted in individual rows as described in the pre-emergence test, supra. Two weeks after planting the plant foliage was sprayed with a solution of the test compounds at a rate equivalent to 20.0 pounds/acre. The treated plants were placed back in the greenhouse. Injury ratings were recorded 14 days after treatment. The rating system is the same as that used in the pre-emergence test. Table III lists the results obtained therefrom.

TABLE III.—POST-EMERGENCE ACTIVITY RATE 20 LBS./A

| Compound No. | Crab grass | Water grass | Wild oat | Mustard | Curled dock | Pinto bean |
|---|---|---|---|---|---|---|
| 1 | +++ | +++ | ++ | ++ | + | +++ |
| 2 | +++ | +++ | ++ | + | - | + |
| 3 | - | + | - | ++ | - | + |
| 4 | +++ | +++ | ++ | +++ | +++ | +++ |
| 5 | +++ | +++ | ++ | +++ | +++ | +++ |
| 6 | +++ | +++ | + | +++ | +++ | ++ |
| 7 | +++ | ++ | - | ++ | ++ | ++ |
| 8 | +++ | +++ | +++ | +++ | +++ | +++ |
| 9 | +++ | +++ | ++ | +++ | +++ | +++ |
| 10 | +++ | +++ | ++ | +++ | +++ | +++ |
| 11 | +++ | +++ | + | +++ | +++ | ++ |
| 12 | +++ | +++ | ++ | +++ | +++ | ++ |
| 13 | +++ | +++ | + | +++ | +++ | +++ |
| 14 | +++ | +++ | +++ | +++ | +++ | +++ |
| 15 | - | + | - | + | - | + |
| 16 | +++ | ++ | ++ | ++ | + | +++ |
| 17 | - | - | ++ | ++ | + | + |
| 18 | +++ | +++ | + | +++ | +++ | ++ |
| 19 | +++ | ++ | ++ | +++ | ++ | +++ |
| 20 | +++ | ++ | ++ | +++ | ++ | +++ |
| 21 | +++ | +++ | + | +++ | ++ | +++ |
| 22 | +++ | ++ | - | ++ | ++ | + |
| 23 | +++ | ++ | [++] | ++ | ++ | + |
| 24 | +++ | ++ | [+] | +++ | ++ | ++ |
| 25 | ++ | ++ | [++] | + | ++ | + |
| 26 | ++ | - | [+] | + | ++ | ++ |
| 27 | ++ | ++ | [++] | ++ | ++ | + |

[ ]—Red oats.

In addition to the above mentioned compounds the following compounds were found to give effective control of the test weed species in both pre-emergence and post-emergence screening: methylthio-N-ethylcarbamylmethyl-chloroacetamide, phenylthio-N-ethylcarbamylmethyl-chloroacetamide, methylthio-N-(2-propenyl)carbamylmethyl-chloroacetamide, and ethylthio-N-n-butylcarbanyl-methyl-chloroacetamide. On further evaluation of pre-emergence activity the following compounds produced a 75% or better control of four grasses and at least one broadleaf specie at 2 lbs. per acre: compounds number 4, 5, 8, 9, 16, 19 and 20.

The compounds of the present invention may be used as pre-emergence or post-emergence herbicides and may be applied in a variety of ways at various concentrations. In practice the compounds are usually formulated with an inert herbicidal adjuvant, utilizing methods well-known to those skilled in the art, thereby making them suitable for application as dusts, sprays or drenches. The amount applied will depend upon the nature of the seeds or plants to be controlled and the rate of application may vary from 1 to 50 pounds per acre. One particularly advantageous way of applying the herbicidal composition comprising the adjuvant and an effective amount of a compound of the present invention is as a narrow band along a row crop, straddling the row.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The method of combating weeds comprising applying thereto a phytotoxic amount of a compound of the formula:

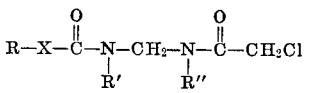

wherein X is selected from the group consisting of oxygen and sulfur, R is selected from the group consisting of alkyl having from 1 to 10 carbon atoms, inclusive, lower alkenyl, lower alkynyl, lower haloalkyl, phenyl, nuclearly substituted phenyl wherein said substituents are from 1 to 5 chlorine atoms, inclusive, and naphthyl, R' is selected from the group consisting of hydrogen, lower alkyl, phenyl, lower alkenyl and cyclohexyl, and R" is selected from the group consisting of hydrogen, lower alkyl and lower alkenyl.

2. A method of combating weeds comprising applying thereto a phytotoxic amount of the compound having the formula:

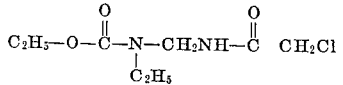

3. A method of combating weeds comprising applying thereto a phytotoxic amount of the compound having the formula:

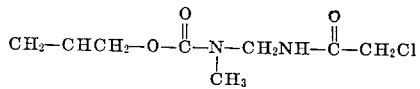

4. A method of combating weeds comprising applying thereto a phytotoxic amount of the compound having the formula:

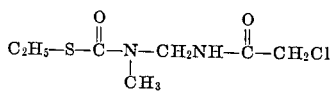

5. A method of combating weeds comprising applying thereto a phytotoxic amount of the compound having the formula:

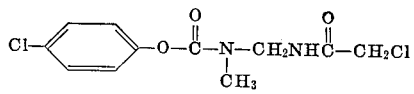

6. A method of combating weeds comprising applying thereto a phytotoxic amount of the compound having the formula:

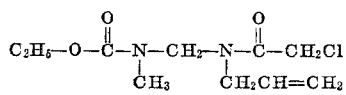

References Cited

UNITED STATES PATENTS

| | | | |
|---|---|---|---|
| 2,864,683 | 12/1958 | Hamm et al. | 71—118 |
| 2,864,684 | 12/1958 | Speziale | 71—118 |
| 3,020,261 | 2/1962 | Brown. | |
| 3,238,036 | 3/1966 | Herrett | 71—106 |
| 3,337,600 | 8/1967 | Speziale et al. | 71—100 |
| 3,391,180 | 7/1968 | Haubein | 71—106 |
| 3,410,898 | 11/1968 | Speziale et al. | 71—118 |

FOREIGN PATENTS 632,153  9/1963  Belgium.

OTHER REFERENCES

Curtius et al., Conversion of Diazohydrazides into mono halo (1910) hydrazides and zides (1910) CA4 pp. 3229–30.

Schraufstatter et al., Z. Naturforsch, vol. 17b. pp. 505–516.

LEWIS GOTTS, Primary Examiner

G. HOLLRAH, Assistant Examiner

U.S. Cl. X.R

71—106, 111; 260—455, 471, 479, 482

PR-630AA

UNITED STATES PATENT OFFICE
CERTIFICATE OF CORRECTION

PO-1050 (5/69)

Patent No. 3,493,360          Dated Feb. 3, 1970

Inventor(s) Llewellyn W. Fancher, et al.

It is certified that error appears in the above-identified patent and that said Letters Patent are hereby corrected as shown below:

Column 2, EXAMPLE I, Line 20 - "(0.04 M)" should read -- (0.4 M) --.

Table I, Compound No. 9, under column "R" - "do" should read -- propenyl --.

Claim 3, Formula should read:

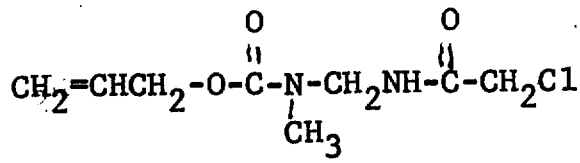

SIGNED AND SEALED
OCT 13 1970

(SEAL)
Attest:
Edward M. Fletcher, Jr.
Attesting Officer

WILLIAM E. SCHUYLER, JR.
Commissioner of Patents